(12) United States Patent  
Eschbach

(10) Patent No.: US 7,997,374 B2  
(45) Date of Patent: Aug. 16, 2011

(54) VEHICLE OCCUPANT SAFETY SYSTEM AND METHOD FOR DETECTING THE POSITION OF A VEHICLE OCCUPANT

(75) Inventor: Ernst Eschbach, Dachau (DE)

(73) Assignee: TRW Automotive GmbH, Alfdorf (DE)

( * ) Notice: Subject to any disclaimer, the term of this patent is extended or adjusted under 35 U.S.C. 154(b) by 485 days.

(21) Appl. No.: 11/788,894

(22) Filed: Apr. 23, 2007

(65) Prior Publication Data

US 2007/0257474 A1 Nov. 8, 2007

(30) Foreign Application Priority Data

May 8, 2006 (DE) .................. 10 2006 021 380

(51) Int. Cl.  
*B60R 21/00* (2006.01)

(52) U.S. Cl. ........ 180/268; 180/274; 180/282; 280/735; 701/45

(58) Field of Classification Search .................. 180/268, 180/274, 282, 214; 280/735; 701/45  
See application file for complete search history.

(56) References Cited

U.S. PATENT DOCUMENTS

| | | | |
|---|---|---|---|
| 5,626,359 | A | 5/1997 | Steffens, Jr. et al. |
| 6,219,605 | B1 | 4/2001 | Bauer et al. |
| 6,282,473 | B1 | 8/2001 | Steffens, Jr. |
| 6,367,837 | B1 * | 4/2002 | Hamada et al. ............... 280/735 |
| 6,419,262 | B1 | 7/2002 | Fendt et al. |
| 6,425,603 | B1 | 7/2002 | Eschbach |
| 6,758,495 | B2 | 7/2004 | Brambilla et al. |
| 6,773,030 | B2 | 8/2004 | Fischer |
| 6,926,221 | B2 | 8/2005 | Rohrle et al. |
| 2004/0216939 | A1 | 11/2004 | Lorenz et al. |
| 2006/0097496 | A1 | 5/2006 | Theisen et al. |
| 2007/0114768 | A1 * | 5/2007 | Lennir ......................... 280/735 |

FOREIGN PATENT DOCUMENTS

| | | |
|---|---|---|
| DE | 19610833 | 9/1996 |
| DE | 19845087 | 4/2000 |
| DE | 19932696 | 9/2000 |
| DE | 10020795 | 11/2000 |
| DE | 19946072 | 3/2001 |
| DE | 10005010 | 8/2001 |
| DE | 10060649 | 8/2001 |
| DE | 10123921 | 1/2003 |
| DE | 19546297 | 12/2003 |
| DE | 10246055 | 4/2004 |
| DE | 102004048129 | 4/2006 |
| DE | 102004057064 | 6/2006 |
| WO | 2005044637 | 5/2005 |

* cited by examiner

*Primary Examiner* — Eric Culbreth  
(74) *Attorney, Agent, or Firm* — Tarolli, Sundheim, Covell & Tummino LLP

(57) ABSTRACT

A vehicle occupant safety system has at least one restraint device having at least one adjustable parameter, a vehicle seat having at least one seat sensor detecting the sitting position of a vehicle occupant, a seatbelt system having at least one belt extension sensor detecting the belt extension length, and a control unit determining from the values from the seat sensor and from the belt extension sensor whether a vehicle occupant is in a forward-leaning position. The control unit then specifies the value of the adjustable parameter of the restraint device as a function of a forward-leaning position of the vehicle occupant.

13 Claims, 2 Drawing Sheets

VEHICLE OCCUPANT SAFETY SYSTEM AND METHOD FOR DETECTING THE POSITION OF A VEHICLE OCCUPANT

FIELD OF THE INVENTION

The invention relates to a vehicle occupant safety system.

BACKGROUND OF THE INVENTION

Nowadays, it is a matter of course that vehicles make use of the restraint devices of vehicle occupant safety systems in order to protect the occupants from the consequences of accidents to the greatest extent possible.

This is achieved, for example, through the use of airbags installed in various places such as the steering wheel, the dashboard or on the sides of the vehicle. Furthermore, belt tensioners are being installed in the seatbelt systems more and more often, these belt tensioners limiting the forward movement of the vehicle occupant in case of an accident. It is also a known procedure to use so-called pre-crash sensors that already initiate a reversible tensioning of the seatbelt prior to a potential accident. In order to cushion the vehicle occupant more gently, belt force limiters are used that, beyond a certain force threshold, allow the seatbelt to be extended to a limited degree.

To the extent possible, the restraint systems are not adapted to an average vehicle occupant but rather, to the actual vehicle occupant. For this purpose, e.g., the unfolding depth of an airbag, its inflation hardness or the force threshold of the belt force limiter can be specified as a function of the weight, the sitting position or even the momentary position of the occupant in the vehicle. The detection of such occupant-related parameters should, of course, be as simple as possible in order to keep the associated costs to a minimum.

BRIEF SUMMARY OF THE INVENTION

It is an object of the invention to create a vehicle occupant safety system that can be preset in a simple manner.

This object is achieved in a vehicle occupant safety system comprising at least one restraint device having at least one adjustable parameter, a vehicle seat having at least one seat sensor detecting the sitting position of a vehicle occupant, a seatbelt system having at least one belt extension sensor detecting the belt extension length, and a control unit determining from the values from the seat sensor and from the belt extension sensor whether a vehicle occupant is in a forward-leaning position. The control unit specifies the value of the adjustable parameter of the restraint device as a function of a forward-leaning position of the vehicle occupant. If the vehicle occupant is in a forward-leaning position, for instance, because he happens to be adjusting the temperature controls or the radio on the dashboard or because he is bending down to pick up something that has fallen onto the floor, and if an accident happens at this moment, then the control unit can systematically influence the restraint device to nevertheless effectuate an optimal restraint.

The two parameters "sitting position" and "belt extension length" allow a clear-cut conclusion about whether the vehicle occupant is leaning forward with his upper body. In such a case, the load is distributed on the seat surface in a particular manner, namely, mainly in the front part, while at the same time, the belt extension length increases. If both of these factors are present, then it is clear that the upper body has moved. In other situations, for example, with a heavy vehicle occupant or someone wearing heavy clothes, or if the seatbelt is loosened by hand, a different weight distribution on the seat occurs. If the vehicle occupant merely slides forward on the seat, for example, if a passenger is looking for a more comfortable sitting position on the seat, then the pronounced seatbelt extension will not be present. Therefore, on the basis of the two above-mentioned parameters, it is easily detectable by control unit that a vehicle occupant is leaning forward. Consequently, it is possible to dispense with expensive detection systems such as cameras or infrared or ultrasound sensors.

Another object of the invention is to provide a simple method for detecting the position of a vehicle occupant.

This object is achieved by a method for detecting the position of a vehicle occupant, in which the signal from at least one seat sensor and the signal from at least one belt extension sensor are detected, and it is ascertained from the sensor signals whether the vehicle occupant is in a forward-leaning position. In order to ascertain this, it is possible to make use, for example, of the fact that the weight of a vehicle occupant shifts towards the front when he leans forward, as a result of which a different load is exerted on the seat sensor than when a vehicle occupant is seated in a normal position, and at the same time, when he leans forward, the belt extension length increases. These two features make it unambiguously clear that the occupant is leaning forward and not, for example, that he is sliding forward or loosening the seatbelt by hand or that a heavy vehicle occupant is putting on his seatbelt.

Such a method may advantageously be employed in a vehicle occupant safety system as described in this application.

Preferably, the seat sensor detects a weight shift on the part of the vehicle occupant. This always occurs when a person leans forward and is thus well-suited as a detection parameter.

In case of an accident, only a very limited period of time is available before the restraint devices have to be activated. Consequently, it is advantageous for the value of the adjustable parameter to be specified at predetermined time intervals before the activation of the restraint device. Here, the appertaining parameter(s) may be set quasi-statically, that is to say, a measurement is carried out at periodical time intervals and the control unit transmits the appertaining values to the restraint device. If an accident then occurs, the restraint device is already set at the correct value. The measurement takes place at suitable time intervals ,so that if a vehicle occupant leans forward, this can be reliably detected in the time span that is typical of such a movement. Preferably, it is also detected when the vehicle occupant has returned to a normal sitting position once again, and the setting of the restraint device parameter is adapted accordingly.

Another option is to specify the value of the adjustable parameter during the activation of the restraint device. The value may be only specified at this point in time, but it is also possible to then merely make an eventually necessary correction of an already preset value.

An airbag module having a gas generator and an airbag is preferably provided as the restraint device.

Here, the deployment depth of the airbag may serve as the adjustable parameter. If the vehicle occupant is in a forward-leaning position, the deployment depth of the airbag is reduced accordingly.

The deployment depth of the airbag can be set, for example, by means of a released length of a tether.

The setting may be made at certain time intervals during the operation of the vehicle irrespective of an accident or, for example additionally, at the moment of the accident.

The ignition time for at least one stage of the gas generator may also be used as the adjustable parameter. For example, it is possible to trigger a second stage of the gas generator at a later point in time or not to trigger it at all, if the vehicle occupant is too close to the airbag. This may be used as an alternative or in addition to the setting of the deployment depth of the airbag.

An actuation mechanism for at least one gas outlet opening may be provided on the airbag module and the point in time of opening and/or the degree of opening of the gas outlet opening may be used as the adjustable parameter. In this manner, the internal pressure of the airbag can be systematically reduced if an accident occurs and the vehicle occupant is leaning forward.

As an alternative or additionally, at least one belt tensioner is provided as the restraint device. For instance, the belt tensioner is ignited at the earliest possible point in time, if a leaning-forward position is detected, in order to prevent a further forward movement or in order to try to bring the vehicle occupant to a somewhat upright position before the airbag is deployed.

The restraint device preferably also contains a belt force limiter. A threshold value of the belt force limiter may serve as the adjustable parameter. The force limitation is preferably preset at a higher-than-normal value when a forward-leaning position is detected.

Advantageously, a pre-crash sensor is provided and the restraint device contains a pretensioner that is activated when the pre-crash sensor is triggered and when a forward-leaning position is detected, with the aim of bringing the vehicle occupant in a somewhat upright position or of prompting him to sit upright before an accident actually occurs. If an accident then does occur, the vehicle occupant will be sitting much more upright than without the action of the pretensioner when he is restrained, for example, by the airbag and the belt tensioner.

Preferably, the adjustable parameter is specified as a function of the extent to which the vehicle occupant is leaning forward. The position of the upper body can be detected incrementally or continuously by means of the seat sensor, for example, by detecting the weight shift as well as the length of the extended seatbelt. If the restraint device allows this, the adjustable parameter may be systematically specified in various increments or continuously.

DETAILED DESCRIPTION OF A PREFERRED EMBODIMENT

Figure 1:
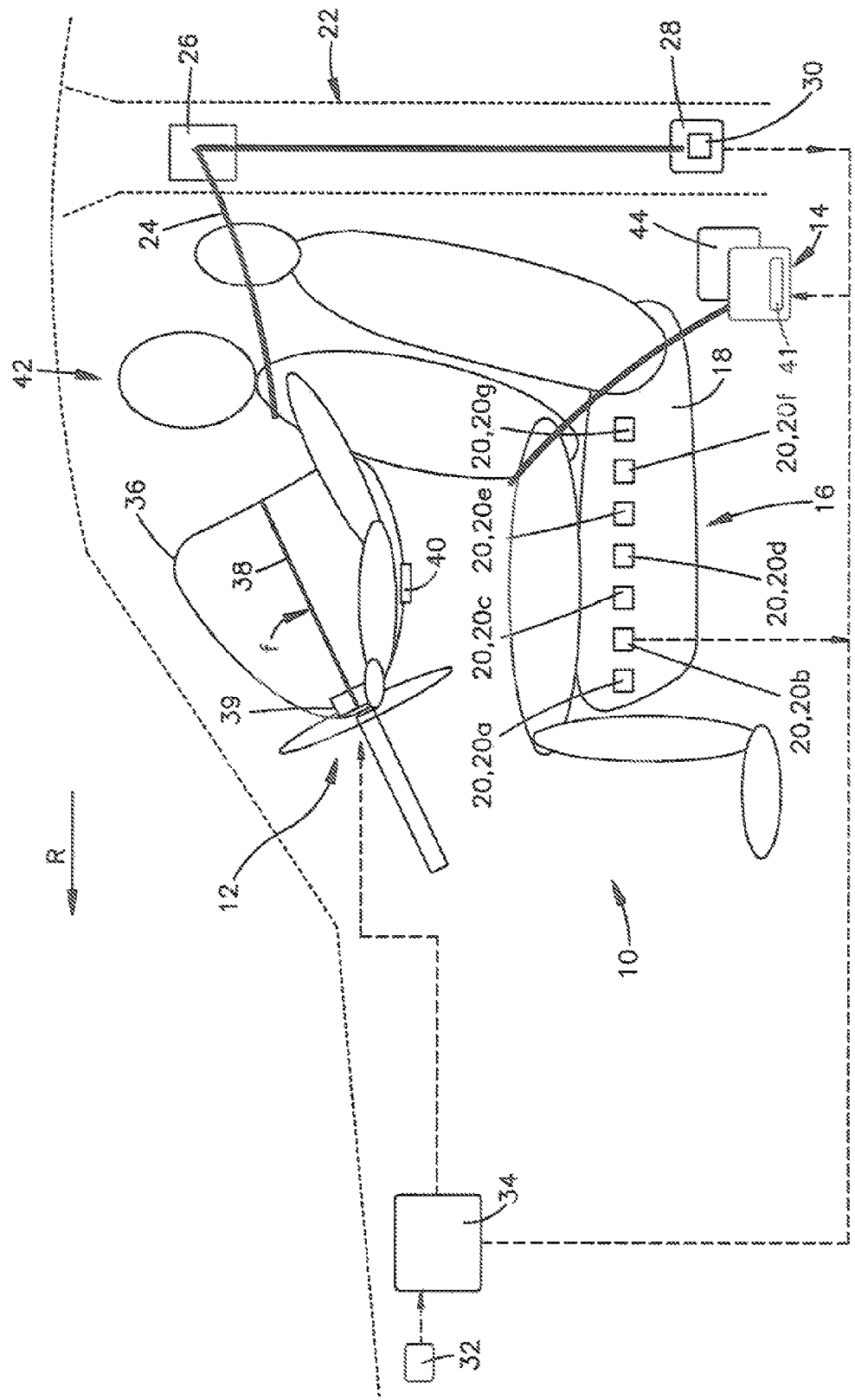
FIG. 1 shows a schematic diagram of a vehicle occupant safety system according to the invention in a situation in which the vehicle occupant is sitting in a normal position.

FIG. 1 shows a vehicle occupant safety system 10 with a first restraint device 12, here an airbag module arranged in the steering wheel, and a second restraint device 14, represented here by an end fitting tensioner. Additional airbag modules or belt tensioners (not shown here) can also be provided as restraint devices, for example, side airbag modules, buckle tensioners or retraction tensioners.

The vehicle occupant safety system 10 further comprises a vehicle seat 16 in whose seat cushion several seat sensors 20 are provided one behind the other along the lengthwise direction R of the vehicle. Seven sensors 20 are shown here. The sensor located furthest towards the front in the lengthwise direction R is designated as 20a, and the sensor located furthest to the back in the lengthwise direction R is designated as 20g (between them are arranged the sensors 20b, c, d, e and f, which are only shown in FIG. 1). However, the person skilled in the art can adapt the number and arrangement of the seat sensors 20 to any particular circumstances.

Further, a seatbelt system 22 is provided, which comprises a seatbelt 24 as well as a conventional deflection fitting 26 and a belt retractor 28. As already mentioned, the belt retractor 28 can also comprise a retraction tensioner.

The seatbelt system has at least one belt extension sensor 30 to detect a belt extension length $L_G$. The belt extension sensor 30 is arranged in the belt retractor 28 here, but it could also be located at any other suitable place in the seatbelt system 22.

Moreover, a pre-crash sensor 32 is installed in the vehicle and, using suitable means, this pre-crash sensor 32 can ascertain dangerous driving situations before the actual occurrence of an accident and it emits a signal to this effect.

The seat sensors 20a-g, the belt extension sensor 30 and the pre-crash sensor 32 are connected to a control unit 34 that processes the data from the individual sensors.

Figure 2:
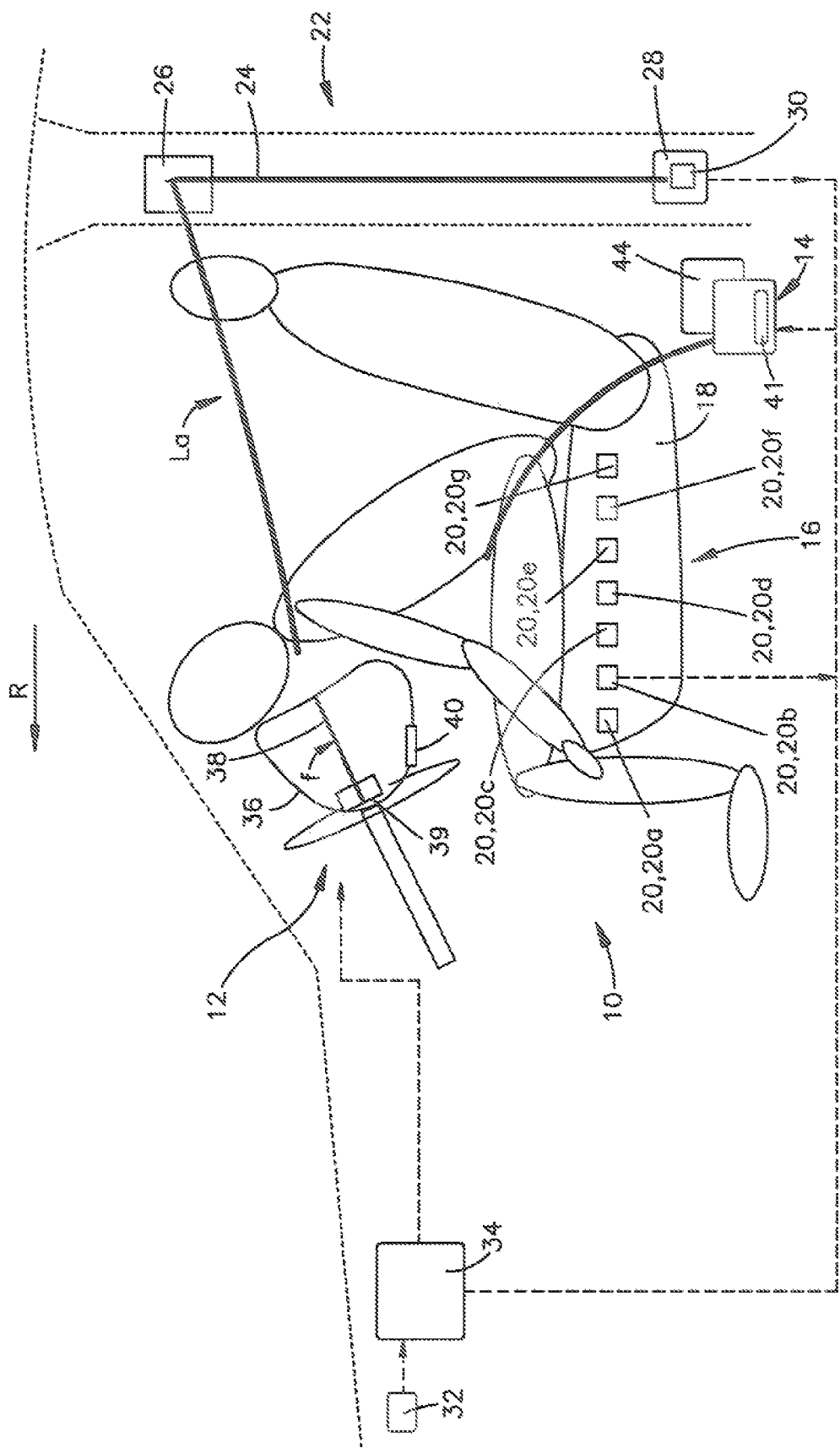
FIG. 2 shows the safety system of FIG. 1, in a situation in which the vehicle occupant is sitting in a forward-leaning position.

The control unit 34 is also connected to the restraint devices 12, 14 and is able to set certain adjustable parameters of the restraint devices 12, 14 (see arrows in FIGS. 1 and 2).

The adjustable parameters include, among others, the deployment depth of an airbag 36 of the airbag module, which can be defined by the released length f of a tether 38 located inside the airbag 36, the ignition time or the number of ignited stages of a gas generator 39 for the airbag 36 and the point in time of opening and/or the degree of opening of a variable gas outlet opening 40 on the airbag module or on the airbag 36.

The released length f of the tether 38 can be set in any manner generally known to a person skilled in the art, for example, by means of a winding mechanism that can be lockable in various positions.

For the second restraint device 14, for example, the ignition time of the belt tensioner or a set value of a belt force limiter 41 contained therein serves as the adjustable parameter.

As a function of the sensor data generated by the seat sensors 20a-g, by the belt extension sensor 30 or by the pre-crash sensor 32, the control unit 34 specifies the adjustable parameters of the restraint devices 12, 14.

On the basis of the data from the seat sensors 20a-g and from the belt extension sensor 30, the control unit 34 detects whether the vehicle occupant 42 is in a forward-leaning position (see FIG. 2) on the vehicle seat 16. For this purpose, the fact is utilized that, when a certain load exerted on the seat sensors 20a-g—corresponding to a weight shift on the part of the vehicle occupant 42 towards the front in the vehicle lengthwise direction R—coincides with a belt extension length $L_G$ (indicated in FIG. 2) that has increased by a relatively large amount within a short period of time, it can be reliably concluded that the vehicle occupant is in a forward-leaning position.

In this case, for example, the sensor 20a is loaded to a greater extent while the sensor 20g is loaded to a lesser extent than in the normal sitting position of the vehicle occupant 42 as shown in FIG. 1. In order to detect the weight distribution of the vehicle occupant 42, it is not necessarily required to have the number of seat sensors 20 shown here. It is also possible to detect a weight shift on the part of the vehicle occupant 42 with more or with fewer sensors 20, even with one single seat sensor 20. Here, it should merely be kept in mind that the weight of the vehicle occupant 42 shifts onto the front part of the seat surface of the vehicle seat 16 when he leans forward. The seat sensor(s) 20 has/have to be positioned accordingly and adapted in terms of their measuring behavior.

As well as determining the belt extension length $L_G$, the control unit 34 can also determine the time duration of the belt extension. For example, immediately after the seatbelt has been put on, a normal length is stored once the vehicle occupant has not moved for some time and consequently the belt extension length has not changed for some time. If the belt extension length $L_G$ becomes longer by a certain predetermined value, then the control unit 34 concludes that the vehicle occupant 42 is leaning forward if, at the same time, corresponding values of the seat sensors 20*a-g* are present.

If the control unit 34 ascertains on the basis of the data from the seat sensors 20*a-g* and from the belt extension sensor 30 that the vehicle occupant is in the forward-leaning position, it specifies the values of the adjustable parameters of the restraint devices according to a predetermined and stored pattern.

If the vehicle occupant 42 is in a forward-leaning position, for example, the released length f of the tether 38 is reduced.

By the same token, as an alternative or in addition, the point in time of opening and/or the degree of opening of the gas outlet opening 40 is adapted in such a way that as much gas as possible can flow out of the airbag 36 as early as possible.

The gas generator 39 is set in such a way that only one stage is ignited for filling the airbag 36.

At the same time or as an alternative, in the case of the second restraint device 14, here the belt tensioner, the earliest and highest possible tensioning force is set and, for example, a high threshold for the force limitation is set. If several belt tensioners are provided, it is also possible to activate all of the belt tensioners with maximum force in case of an accident.

On the basis of the data from the seat sensors 20*a-g* and from the belt extension sensor 30, the extent to which the vehicle occupant is leaning forward can be detected continuously. If the adjustable parameters permit, they can be specified as a function of the extent to which the vehicle occupant is leaning forward. For example, the released length f of the tether 38 or the degree of opening of the gas outlet opening 40 can be specified continuously, or else the ignition of second stages of the gas generator 39 of the airbag module or of the belt tensioner or the force limitation can be specified incrementally. A corresponding allocation table is stored in the control unit 34.

The preset specification of the values of the adjustable parameters takes place continuously during normal operation of the vehicle. For this purpose, the sensor data is queried at predetermined, periodical time intervals and the adjustable parameters are specified by the control unit 34 but of course, without an activation of the restraint devices 12, 14. The time intervals could also be variable; for example, the time interval of the measurements could be shortened in hazardous situations, among other things, depending on the vehicle speed, the traffic density or a detected forward-leaning position of the vehicle occupant 42.

In case the pre-crash sensor 32 detects a hazardous situation and the control unit 34 ascertains that the vehicle occupant 42 is sitting in a forward-leaning position, if applicable, a reversible pretensioner 44, which is likewise part of the second restraint device 14, is activated in order to bring the vehicle occupant to an upright position or to prompt him to sit upright.

The control unit 34 specifies the adjustable parameters as a function of the extent to which the vehicle occupant 42 is currently leaning forward.

If an accident occurs, the restraint devices 12, 14 are activated with the preset values.

The values of the adjustable parameters could also be specified at the point in time of an accident. This can be done in addition to the specification of the values at predetermined points in time during normal operation of the vehicle or else exclusively so.

The invention claimed is:

1. A vehicle occupant safety system, comprising:
    at least one restraint device (12, 14) having at least one adjustable parameter,
    a vehicle seat (16) having at least one seat sensor (20*a-g*) detecting the sitting position of a vehicle occupant (42), and a weight shift on the part of the vehicle occupant (42),
    a seatbelt system (22) having at least one belt extension sensor (30) detecting the belt extension length (LG), and
    a control unit (34) determining from the values of the sitting position and weight shift of the vehicle occupant from the seat sensor (20*a-g*) and a change in the belt extension length (LG) from the belt extension sensor (30) whether a vehicle occupant (42) is in a forward-leaning position,
    the control unit (34) specifying the value of the adjustable parameter of the restraint device (12, 14) as a function of a forward-leaning position of the vehicle occupant (42).

2. The vehicle occupant safety system according to claim 1, wherein the value of the adjustable parameter is specified at predetermined time intervals before the activation of the restraint device (12, 14).

3. The vehicle occupant safety system according to claim 1, wherein the value of the adjustable parameter is specified during the activation of the restraint device (12, 14).

4. The vehicle occupant safety system according to claim 1, wherein an airbag module having a gas generator (39) and an airbag (36) is provided as the restraint device (12).

5. The vehicle occupant safety system according to claim 4, wherein a deployment depth of the airbag (36) serves as the adjustable parameter.

6. The vehicle occupant safety system according to claim 5, wherein the deployment depth of the airbag (36) is set by means of a released length (f) of a tether (38).

7. The vehicle occupant safety system according to claim 4, wherein an ignition time for at least one stage of the gas generator (39) serves as the adjustable parameter.

8. The vehicle occupant safety system according to claim 4, wherein at least one gas outlet opening (40) is provided on the airbag module and in that at least one of the point in time of opening and the degree of opening of the gas outlet opening (40) serves as the adjustable parameter.

9. The vehicle occupant safety system according to claim 1, wherein at least one belt tensioner is provided as the restraint device (14).

10. The vehicle occupant safety system according to claim 9, wherein an ignition time of the belt tensioner serves as the adjustable parameter.

11. The vehicle occupant safety system according to claim 9, wherein the restraint device (14) contains a belt force limiter (41) and in that a threshold value of the belt force limiter (41) serves as the adjustable parameter.

12. The vehicle occupant safety system according to claim 1, wherein a pre-crash sensor (32) is provided and the restraint device (14) contains a pretensioner (44) and in that, when the pre-crash sensor (32) is triggered and when a forward-leaning position is detected, the pretensioner (44) is activated.

13. The vehicle occupant safety system according to claim 1, wherein the adjustable parameter is specified as a function of the extent to which the vehicle occupant is leaning forward.

* * * * *